(12) United States Patent
Lorenz et al.

(10) Patent No.: US 7,238,149 B2
(45) Date of Patent: Jul. 3, 2007

(54) PROCESS FOR THE MANUFACTURE OF PAPERBOARD CARTONS

(75) Inventors: Randolph John Lorenz, Wyomissing, PA (US); Christian Leonard Daniels, Macungie, PA (US); John Joseph Rabasco, Allentown, PA (US)

(73) Assignee: Air Products Polymers, L.P., Allentown, PA (US)

( * ) Notice: Subject to any disclaimer, the term of this patent is extended or adjusted under 35 U.S.C. 154(b) by 11 days.

(21) Appl. No.: 11/029,292

(22) Filed: Jan. 5, 2005

(65) Prior Publication Data

US 2006/0148628 A1   Jul. 6, 2006

(51) Int. Cl.
   B31B 1/62   (2006.01)
   B31B 1/64   (2006.01)

(52) U.S. Cl. .......... 493/128; 493/68; 493/133; 427/532; 427/331; 427/388.4; 427/391; 428/500; 524/458; 524/517

(58) Field of Classification Search .......... 427/532, 427/541, 331, 372.2, 384, 388.4, 391, 395; 428/500; 524/458, 517; 493/128–135, 148, 493/150, 151, 68
See application file for complete search history.

(56) References Cited

U.S. PATENT DOCUMENTS

| | | | |
|---|---|---|---|
| 3,355,322 A * | 11/1967 | Worrall et al. .......... 428/514 |
| 3,788,876 A * | 1/1974 | Baker et al. .......... 229/132 |
| 4,490,129 A | 12/1984 | Oakley et al. |
| 5,217,159 A * | 6/1993 | Calvert et al. .......... 229/136 |
| 5,228,272 A * | 7/1993 | Calvert et al. .......... 53/477 |
| 5,462,223 A * | 10/1995 | Focke et al. .......... 229/160.1 |
| 5,872,181 A * | 2/1999 | Daniels et al. .......... 524/563 |
| 6,063,858 A * | 5/2000 | Daniels et al. .......... 524/563 |
| 6,316,568 B1 | 11/2001 | Kohlammer et al. ........ 526/287 |
| 6,319,978 B1 * | 11/2001 | Daniels et al. .......... 524/564 |
| 6,559,259 B2 * | 5/2003 | Kohlhammer et al. ...... 526/287 |
| 2001/0011445 A1 | 8/2001 | Scolaro et al. |
| 2001/0034999 A1 | 11/2001 | Xiong et al. |
| 2002/0086174 A1 | 7/2002 | Genske et al. |
| 2002/0139084 A1 | 10/2002 | Tobolka et al. |
| 2003/0031763 A1 | 2/2003 | Inagaki et al. |
| 2003/0051441 A1 | 3/2003 | Adair, Jr. et al. |
| 2003/0055191 A1 | 3/2003 | Yasaka et al. |
| 2003/0070396 A1 | 4/2003 | Lam et al. |
| 2003/0087114 A1 | 5/2003 | Ferri et al. |
| 2003/0087115 A1 | 5/2003 | Ferri et al. |
| 2003/0091763 A1 | 5/2003 | Ferri et al. |
| 2004/0164135 A1 * | 8/2004 | Gong et al. .......... 229/132 |
| 2004/0166238 A1 | 8/2004 | Nowicki et al. |
| 2004/0175589 A1 * | 9/2004 | Rabasco et al. .......... 428/511 |
| 2004/0242106 A1 * | 12/2004 | Rabasco et al. .......... 442/374 |
| 2005/0100706 A1 * | 5/2005 | Rabasco et al. .......... 428/96 |
| 2005/0196540 A1 * | 9/2005 | Pepe et al. .......... 427/384 |
| 2006/0024338 A1 * | 2/2006 | Hegedus et al. .......... 424/401 |

FOREIGN PATENT DOCUMENTS

| | | |
|---|---|---|
| DE | 1957529 | 5/1971 |
| EP | 0017678 | 11/1979 |
| EP | 1454930 A2 | 9/2004 |
| EP | 1482081 A1 | 12/2004 |
| GB | 1335671 A | 10/1973 |

* cited by examiner

*Primary Examiner*—Hemant M. Desai
(74) *Attorney, Agent, or Firm*—Mary E. Bongiorno; Russell L. Brewer

(57) ABSTRACT

This invention relates to an improvement in a process for forming a carton from paperboard stock comprising the steps:
  applying an aqueous based adhesive to select parts of a paperboard carton blank obtained from a paperboard feedstock;
  drying the aqueous based adhesive;
  folding the select parts of the adhesive coated carton blank onto cooperating parts of the paperboard blank; and,
  heat sealing the select and cooperating parts thereby forming the carton;
wherein the aqueous based adhesive is comprised of a vinyl acetate/ethylene polymer formed by emulsion polymerization and having
  (a) a crystalline melting point ($T_m$) ranging from 35 to 110° C., preferably 50 to 90° C.; measured at a heat rate of 20° C./minute and,
  (b) a tensile storage modulus of at least $1 \times 10^4$ dynes/cm$^2$ at 115° C. measured at 6.28 rad/sec.

24 Claims, No Drawings

PROCESS FOR THE MANUFACTURE OF PAPERBOARD CARTONS

BACKGROUND OF THE INVENTION

Corrugated cases and cartons have been used in a wide variety of applications such as the packaging of food products and consumer goods, e.g., cereal boxes, precooked and frozen foods. Typically, corrugated cases and cartons are constructed of corrugated or boxboard in which a flat blank is folded and glued to the cooperating parts of the corrugated or carton blank to form a container. Pressure is maintained on the preselected and cooperating parts of the formed carton for a time sufficient for the adhesive to dry or set. Typically, the top and bottom of the erected case or carton also requires to be glued according to the above conditions.

To facilitate the sealing process, thermoplastic and hot melt adhesives have been applied to the cases and cartons by means such as a spray jet, print roller or wheel. In many situations the adhesive is pre-heated by hot air jets to soften and render the adhesive tacky to assist the sealing. Thermosetting adhesives have also been used to facilitate sealing with curing effected by application of heat.

The onsite application of adhesives to the case or carton blank or erected container has created numerous processing issues which often result in run delays and maintenance problems. Hot melt adhesives, which are applied in molten form to the preselected parts of the carton blank, have drawbacks for many reasons. Hot melts, typically are 100 percent solid thermoplastic adhesives, often based on ethylene-vinyl acetate polymers, and need to be heated to between 250–350° F. before being applied to a carton's surface. Because of the high temperatures for application of hot melt adhesives, there are customary health issues resulting from burns and odors. In addition, there are significant issues with respect to the storage, and delivery systems for hot melt adhesives and the maintenance thereof.

Cold set adhesives have been employed in carton formation and sealing but these too present problems. These are slow setting and often incompatible with the high production rate required in the packaging of food products. Water and 100 percent solid based heat sealable polymer systems often do not activate well and many require too high of an activation temperature. Also, the rolled sheets of paperboard stock coated with these adhesives tend to block (stick) together before they can be formed in the carton assembly process and heat sealed.

The following articles and patents are representative of methods for forming cartons:

EP 0017678 A1 discloses the formation of a heat-resistant carton by coating at least one of the carton surfaces with a heat-activated thermosetting adhesive, and then, spraying a water-based adhesive emulsion, e.g., an aqueous emulsion of polyvinyl acetate on the coated surfaces. The carton having the water-based adhesive coated surface is heated by a stream of heated air to at least partially dry the water-based adhesive. The carton surfaces then are placed in contact with each other, and pressure applied for a time sufficient to seal the contacting surfaces together. It is reported that the combination of thermosetting adhesive and water-based adhesive enables the mating surfaces of the carton to be rapidly sealed by automatic carton sealing apparatus.

U.S. Pat. No. 4,490,129 discloses the formation of cartons wherein a water-based adhesive, e.g., polyvinyl acetate is applied in the form of an atomized spray onto selected parts of the carton and then partially dried. Then, the panel to be sealed is pressed together by the punch and die arrangement in carton fabrication.

U.S. Pat. No. 5,228,272 discloses the fabrication of folded paperboard food cartons having a polymer coating on the interior surface and sales graphics on a substantially unplasticized clay coated exterior surface. A water based polymer emulsion such as ethylene/vinyl acetate emulsion is applied by means of a printing press to select areas of the carton blank. Reported in the patent is the use of a full coating of a continuous film of a polymer such as polyethylene, polypropylene and the like to protect against moisture penetration. A water based adhesive (Adcote) is solubilized by acidic modification and adjusted for viscosity by water emulsion is applied by a printing press on select portions and then contacted with a hot air stream and pressed together to fuse the surfaces.

US 2004/0155238 discloses a converting machine comprising a means for depositing a reactivatable adhesive onto a predetermined location of a stock material.

BRIEF SUMMARY OF THE INVENTION

This invention relates to an improvement in a process for forming a paperboard carton. The basic process comprises applying an aqueous based adhesive to select parts of a paperboard carton blank obtained from a paperboard feedstock, drying the adhesive, folding the select parts of the adhesive coated carton blank onto cooperating parts of the paperboard blank and heat sealing the select and cooperating parts thereby forming the carton. The improvement in the carton forming process comprises:

applying as said aqueous based adhesive to select portions of said paperboard feedstock an semi-crystalline vinyl acetate/ethylene adhesive formed by emulsion polymerization and having (a) a crystalline melting point ($T_m$) ranging from 35 to 110° C., preferably 50 to 90° C.; measured at a heat rate of 20° C./minute and, (b) a tensile storage modulus of at least $1 \times 10^4$ dynes/cm$^2$ at 115° C. measured at 6.28 rad/sec. In addition, the emulsion polymerized vinyl acetate/ethylene adhesive should have (c) a crystalline heat of fusion ($\Delta H_f$) ranging from 5 to 100 joules per gram (J/g), preferably 15 to 70 J/g; (d) a glass transition temperature ($T_g$) of +25° C. to about −40° C., and (e) be non-blocking at temperatures of about 75° C. or less; typically at temperatures of 50° C. or less.

Significant advantages can be obtained by using a paperboard feedstock having the vinyl acetate/ethylene adhesive preapplied thereon and these include:

an excellent balance of block resistance and rapid flow at low enough pressures and temperatures to be easily used as heat sealable materials for useful closure systems on paperboard based packaging cartons and corrugated cases;

an ability to eliminate the problems of onsite application of hot melt adhesives such as nozzle plugging, burns, etc.;

an ability to produce paperboard cartons having sealed portions resistant to delamination due to moisture;

an ability to effect excellent adhesion to uncoated board and coated paperboard surfaces, and bond such surfaces over a broad temperature range; and, an ability to effect adhesion of the paperboard surfaces at lower pressures and temperatures than conventional vinyl acetate-ethylene copolymer emulsions of equal block resistance

DETAILED DESCRIPTION OF THE INVENTION

In the manufacture of pre-applied adhesive coated paperboard feedstock for carton manufacture, an adhesive is applied to select parts of the paperboard and the adhesive dried thus forming a preapplied paperboard feedstock. This feedstock then is rolled for storage and shipment to carton manufacturers. In the carton manufacturing process, the preapplied paperboard feedstock is unrolled and carton blanks obtained therefrom. The preselect parts of the carton blank which have the adhesive applied thereto are folded onto cooperating parts of the carton blank. Then, the select and cooperating parts are held together and heated, typically, by means of hot air to activate the heat seal adhesive and seal the select and cooperating parts of the carton. Other means, known in the art, can be used to activate the heat seal adhesive; for example, radiant energy, infrared, and microwave. Alternatively, the carton blank may be formed from the paperboard feedstock and the adhesive applied thereto. The adhesive is dried and the carton formed therefrom as described above.

The heat seal adhesive employed in forming the preapplied paperboard feedstock is critical to the improved process and provides the ability to achieve some of the aforementioned advantages. The heat seal adhesive employed in the improved pre-applied adhesive coated paperboard feedstock is an aqueous-based semi-crystalline vinyl acetate-ethylene copolymer emulsion, wherein the polymer contains crystalline ethylene segments. The heat seal adhesives are prepared via direct aqueous-based free radical emulsion polymerization of vinyl acetate and ethylene and, optionally with various other co-monomers. The semi-crystalline aqueous-based emulsion polymers employed in forming the preapplied paperboard stock have (a) a crystalline melting point ($T_m$) ranging from 35 to 110° C., preferably 50 to 90° C.; measured at a heat rate of 20° C./minute and, (b) a tensile storage modulus of at least $1 \times 10^4$ dynes/cm$^2$ at 115° C. measured at 6.28 rad/sec. In addition, they should have (c) a crystalline heat of fusion ($\Delta H_f$) ranging from 5 to 100 J/g, joules per gram (J/g), preferably 15 to 70 J/g; (d) a glass transition temperature ($T_g$) of +25° C. to about −40° C., and e) be non-blocking at temperatures of about 75° C. or less; typically at temperatures of 50° C. or less.

The aqueous-based polymer emulsions contain crystalline segments resulting from ethylene linkages and are prepared by the emulsion polymerization of ethylene and vinyl acetate, preferably with a carboxylic monomer, in the presence of a stabilizing system consisting essentially of at least one surfactant or a cellulosic protective colloid in combination with a surfactant. A relatively low-pressure process, i.e., less than 2000 psig (13,891 kPa), preferably from about 1000 (6,996 kPa) to about 2000 psig (18,891 kPa) can be used to effect polymerization.

The aqueous based polymer emulsions of this invention are based upon vinyl acetate and ethylene with the level of polymerized units of vinyl acetate ranging from 15 to 90% by weight of the polymer and the level of polymerized units of ethylene ranging from 10% to 85% by weight; preferably from 25 to 80 weight percent vinyl acetate and 20 to 75% by weight ethylene; and most preferably from 35 to 75% by weight vinyl acetate and 25 to 65% by weight ethylene. A preferred embodiment of this aqueous based polymer emulsion is comprised of 30 to 50 wt % vinyl acetate and 50 to 70 wt % ethylene. The distribution of vinyl acetate and of ethylene in the copolymer are accounted for in other parameters of the polymer, i.e., the $T_g$, $T_m$, $\Delta H_f$, and the high temperature tensile storage modulus.

An additional component for consistently enhancing the adhesion of polymers for the preapplied heat seal application resides in the incorporation of a carboxylic acid. These carboxylic acids include $C_3$–$C_{10}$ alkenoic acids, such as acrylic acid, methacrylic acid, crotonic acid, and isocrotonic acid, and alpha, beta-unsaturated $C_4$–$C_{10}$ alkenedioic acids such as maleic acid, fumaric acid, and itaconic acid. Typically, these acids are incorporated in an amount of from 0.2 to 10% by weight and preferably 0.5 to 5% by weight. Exemplary polymers for heat seal applications have a vinyl acetate content of from 15 to 80%, the ethylene content from 20 to 85%, and the level of carboxylic acid from 0 to 5% by weight of the polymer.

Other monomers which can be emulsion polymerized into the polymer generally in small amounts include but are not limited to a $C_1$ to $C_{15}$ alkyl vinyl ester, a $C_1$ to $C_{15}$ alkyl acrylate or a $C_1$ to $C_{15}$ alkyl methacrylate, such as methyl (meth)acrylate, ethyl (meth)acrylate, propyl(meth)acrylate, butyl(meth)acrylate, and 2-ethylhexyl (meth)acrylate, a $C_1$ to $C_6$ hydroxyalkyl(meth)acrylate, such as, hydroxyethyl (meth)acrylate and hydroxypropyl(meth)acrylate, a $C_1$ to $C_{15}$ alkyl maleate, $C_1$ to $C_{15}$ alkyl fumarate, acrylic acid, methacrylic acid. N-methylol amides, $C_1$–$C_4$ alkanoic acid ethers of N-methylol amides and allylcarbamates, such as acrylonitrile, acrylamide, methacrylamide, N-methylol acrylamide, N-methylol methacrylamide, N-methylol allylcarbamate, and $C_1$–$C_4$ alkyl ethers or $C_1$–$C_4$ alkanoic acid esters of N-methylol acrylamide, sodium vinyl sulfonate; and 2-acrylamido-2-methyl propanesulfonate. The monomers can be incorporated in minor amounts, e.g. from 0 to about 10% by weight.

The usefulness of vinyl acetate-ethylene emulsion polymers and their application are dictated by the polymer properties which are in turn are affected by many factors outside the specific formulation employed, e.g., the monomers employed, the monomer ratio, the initiator level and the surfactant package, as well as in the polymerization procedure. For example, because vinyl acetate and ethylene have significantly different vapor pressures when subjected to the polymerization conditions described herein and because ethylene is difficult to solubilize in the polymerization medium, one can dramatically affect the distribution of the vinyl acetate and ethylene within the polymer. Thus, two polymers having substantially equal levels of vinyl acetate and ethylene can have substantially different structures and dramatically different properties.

It has been found that in the development of polymers for pre-applied, heat seal applications by emulsion polymerization that the concentration of vinyl acetate and ethylene in the polymer is not solely responsible for its use as a heat seal adhesive. The distribution of vinyl acetate and ethylene is a major factor. It has been found that there needs to be a sufficient level of amorphous ethylene polymer segments to provide adhesion to a substrate and a sufficient level of crystalline ethylene polymer segments to provide the proper balance of heat seal characteristics and non-blocking. Polymerized ethylene segments lead to ethylene crystallinity in the polymer. Too much of one and too little of another can lead to polymers which have little adhesion in terms of hot green strength and room temperature adhesive strength, but pass the non-blocking test or they may have desired adhesion but are do not meet the non-blocking test at desired temperature and pressure.

In vinyl acetate-ethylene polymers the $T_g$ of the polymer can be controlled by adjusting the ethylene content, i.e., generally the more ethylene present in the polymer relative to other co-monomers, the lower the $T_g$. However, it has been found that under certain polymerization conditions where formation of crystalline polyethylene domains are favored, the $T_g$ does not continue to systematically decrease in proportion to the increase in ethylene concentration.

Crystalline polyethylene domains in the polymer impart a $T_m$ and $\Delta H_f$ to the polymer. It has also been found that by influencing the balance of amorphous ethylene-vinyl acetate domains and crystalline ethylene domains in the polymer, one can generate a range of aqueous copolymer dispersions containing a range of $T_g$, $T_m$ and $\Delta H_f$, and a high tensile storage modulus at high temperatures; i.e., temperatures of about 115° C. In conventional vinyl acetate/ethylene emulsion polymers, the ethylene units are largely incorporated in an amorphous state and there is a substantial absence of crystalline ethylene domains.

One preferred way to enhance crystalline domain formation of ethylene in the vinyl acetate-ethylene polymer is to delay the addition of vinyl acetate during the polymerization process such that the unreacted vinyl acetate level present in the reactor is minimal at different stages during the process, i.e., below 5% unreacted free vinyl acetate monomer. Particularly, in the absence of carboxyl functionality, it is preferred to stage the addition of vinyl acetate in the polymerization process over an initial period of time. Typically, one completes the addition of vinyl acetate within 75% of the total polymerization period and generally within 3 hours or less. Thus, vinyl acetate/ethylene polymerization can take place in one stage where most, but not all, of the ethylene will reside in amorphous regions, and the formation of the majority of crystalline ethylene domains can occur in another stage of the polymerization process.

The tensile storage modulus profile for these polymers provides an insight to the distribution of vinyl acetate and ethylene in the polymer and the melt flow characteristics. The polymers suited for use as heat seal adhesives as described herein can have a high tensile storage modulus and may be highly viscous with minimal flow properties at temperatures where other ethylene/vinyl acetate and vinyl acetate/ethylene polymers melt and exhibit melt flow characteristics. This allows the heat sealed adhesive bond to maintain its cohesive and adhesive strength when exposed to the elevated temperatures sometimes encountered during storage and transport. The polymers described herein maintain a high viscosity and resistance to flow at temperatures well above their melt temperatures. The modulus should be at least $1\times10^4$ in dynes/cm$^2$ at 115° C. as measured at a test frequency of 6.28 rad/sec.

Other factors leading to crystalline ethylene domains within the polymer include pressure, temperature of polymerization and initiator level. Although pressure is influential in achieving higher ethylene concentration levels in the polymer, it also is a factor in determining whether the amount of ethylene which is present is in amorphous regions or crystalline domains. Temperature, also is relevant in the formation of ethylene crystallinity. Lastly, the level of initiator is also a factor in developing copolymers for pre-applied, heat seal applications.

In the preferred process for effecting polymerization and the formation of vinyl acetate-ethylene polymers for preapplied, heat seal applications, polymerization of ethylene, vinyl acetate, and carboxylic acid is initiated by thermal initiators or by redox systems. Typically, the level of initiator is at least 0.1% and typically greater than 0.3% by weight of the total monomer charged. In addition, it is preferred that the initiator is added over the time of polymerization. Thermal initiators are well known in the emulsion polymer art and include, for example, ammonium persulfate, sodium persulfate, and the like. Suitable redox systems are based upon oxidizing and reducing agents. Reducing agents, such as sodium formaldehyde sulfoxylate and erythorbates are representative. Oxidizing agents, such as hydrogen peroxide and t-butyl hydroperoxide (t-BHP) are representative.

The ethylene and, optionally, other monomers, then are introduced to the reactor at a pressure of less than about 2000 psig (13,891 kPa), or maximum pressure of 1400 to 2000 psig (9754 to 13,891 kPa), with agitation, and the temperature increased to reaction temperature. The pressure typically varies widely during one polymerization run; for example it can vary from 300 to 1600 psig (2169 to 11,133 kPa) in one polymerization run. Initiator, vinyl acetate, and emulsifier are staged or added incrementally over the reaction period, and the reaction mixture maintained at reaction temperature for a time required to produce the desired product.

The formation of polymers suited for pre-applied, heat seal applications is highly influenced by the stabilizer system. First, the stabilizing system must support the formation of emulsions having a solids content of at least 40% by weight, generally 50% by weight and higher. Second, the stabilizing system should be one that does not interrupt ethylene domains leading to crystalline polyethylene segments within the polymer.

The preferred protective colloids employed as a component of one of the suitable stabilizing system described herein is a cellulosic colloid or poly(vinyl alcohol). An example of a cellulosic protective colloid is hydroxyethyl cellulose. The protective colloid can be used in amounts of about 0.1 to 10 wt %, preferably 0.5 to 5 wt %, based on the total monomers.

The surfactant or emulsifier can be used at a level of about 1 to 10 wt %, preferably 1.5 to 6 wt %, based on the total weight of monomers and can include any of the known and conventional surfactants and emulsifying agents, principally the nonionic, anionic, and cationic materials, heretofore employed in emulsion polymerization. Among the anionic surfactants found to provide good results are alkyl sulfates and ether sulfates, such as sodium lauryl sulfate, sodium octyl sulfate, sodium tridecyl sulfate, and sodium isodecyl sulfate, sulfonates, such as dodecylbenzene sulfonate, alpha olefin sulfonates and sulfosuccinates, and phosphate esters, such as the various linear alcohol phosphate esters, branched alcohol phosphate esters, and alkylphenolphosphate esters.

Examples of suitable nonionic surfactants include the Igepal surfactants which are members of a series of alkylphenoxy-poly(ethyleneoxy)ethanols having alkyl groups containing from about 7 to 18 carbon atoms, and having from about 4 to 100 ethyleneoxy units, such as the octylphenoxy poly(ethyleneoxy)ethanols, nonylphenoxy poly(ethyleneoxy)ethanols, and dodecylphenoxy poly(ethyleneoxy) ethanols. Others include fatty acid amides, fatty acid esters, glycerol esters, and their ethoxylates, ethylene oxide/propylene oxide block polymers, secondary alcohol ethoxylates, and tridecylalcohol ethoxylates.

Examples of common cationic surfactants are dialkyl quaternaries, benzyl quaternaries, and their ethoxylates.

Chain transfer agents, water soluble or oil soluble, can be used in the preferred polymerization and formation of ethylene-vinyl acetate polymers for pre-applied heat seal adhesive applications. Any of the common chain transfer agents known in the emulsion polymerization art can be used, such as mercaptan derivatives. Dodecylmercaptan is an example of an oil soluble chain transfer agent. For example, dodecylmercaptan can be dissolved in vinyl acetate monomer and introduced to the reactor via the monomer delay feed. Chain transfer agents are typically used in amounts less than 2.0 weight percent, based on total polymer weight.

Average particle size distributions for the polymer particles of the emulsion polymers of this invention range from 0.05 microns to 2 microns, preferably 0.10 microns to 1 micron.

In an example of using the emulsion polymers of this invention for preapplied paperboard feedstock applications, the emulsion polymers can be applied with a gravure coater to a printed paperboard stock, dried, stored, and shipped to an end user where the board is formed, filled, and sealed. As mentioned, non-block is essential for stacking, handling, and storage of the paperboard feedstock. Yet, a rapid heat seal is desired at low seal pressures and a hot air temperature as low as possible to maximize production and minimize the heat impact on the coated board.

The invention is further clarified by a consideration of the following examples, which are intended to be purely exemplary of the invention.

Ethylene levels in the polymer were determined by mass balance.

Blocking

Blocking is defined as unwanted adhesion between touching layers of an adhesive coated paperboard substrate to itself or an uncoated paperboard substrate. This can occur under moderate pressure, temperature, or high relative humidity (RH) as coated substrates are rolled or wound upon themselves or stacked upon themselves during storage or prior to use.

Blocking Procedure

The coated side of a Lenetta chart was coated with the emulsion sample to be tested using a #20 wire wound rod (to obtain approximately a 1 mil dry coating). The coated Lenetta chart was air dried under TAPPI conditions (73.4° F. (23° C.), 50% RH) for 1 hour. The dried coated substrate was cut into 1 inch×1 inch squares. Twelve of these squares were stacked on top of each other, front-to-back. A 1000 g weight was placed on top of the stacked squares. The composite was placed in the forced draft oven set at 50°C. for 16–18 hours. After removing the composite from the oven, the weight was removed and the composite allowed to cool to room temperature prior to pulling the composite apart to record the results. The results are reported below (the blocking test is not always indicative of the polymer and the recording of a polymer that blocked may not be necessarily attributible solely to the polymer).

The samples are pulled apart carefully and rated for blocking as follows:

1) non-blocking (fell apart); 2) zippy (no surface mars), 3) surface picking (some surface mar); 4) less than 25% fiber tear; 5) less than 50% fiber tear; 6) less than 75% fiber tear; 7) less than 100% fiber tear; and 8) 100% fiber tear (total blocking). A rating of 1 to 3 was considered a "pass."

Adhesion Test Procedure

A substrate (e.g., paperboard, corrugated cardboard, etc) was coated using a single pass of a foam brush and dried overnight (approximately 16 hours) under TAPPI conditions (73.4° F. (23° C.), 50% RH). The coating should be continuous and uniform on the surface of the substrate. A second sheet of the uncoated substrate was placed on top of the coated sheet and the composite heat sealed using either of the two following conditions: 1) place in the jaws of the Sentinel Laboratory Heat Sealer for 1 second at 5–10 psig (170 kPa), or 2) hold the coated and uncoated substrates in a V-formation and force hot air over both surfaces followed by touching the two heated surfaces with light hand pressure to form the bond. The temperature setting will depend on the emulsion used and the substrate used. The heat sealed construction was pulled apart 5 seconds after the heat sealing process to assess hot green strength and the fiber tear recorded. A duplicate samples was allowed to cool to room temperature overnight prior to pulling apart to assess the final bond strength and the fiber tear recorded. Adhesive bond strength was rated according to the following scale: 0) no bond; 1) light tack, no fiber tear; 2) some bonding, no fiber tear; 3) less than 25% fiber tear; 4) less than 50% fiber tear; 5) less than 100% fiber tear; 6) best bond, 100% fiber tear. A final bond fiber tear rating of 4 or higher is acceptable. (In some cases poor adhesion may result from inadequate coating or other variable and may not be necessarily attributable solely to the polymer. For example, those polymers having a $T_m$ and a high $\Delta H_f$ may not melt sufficiently in the time frame allotted to effect adhesion).

Hot Green Strength

Hot green strength is a desirable characteristic of the heat seal bond. It is defined as the strength of the bond as judged by peel adhesion or cleavage immediately after forming the bond in the heat sealing process. Reported data corresponds to percent fiber tear while the bond is still warm. The ability to hold the bond in place until the construction cools results in a firmer, stronger ultimate bond. If the polymer exhibits poor hot green strength, it may still have good heat seal characteristics once the bond reaches room temperature.

Tensile Storage Modulus

Tensile storage modulus as a function of temperature was measured at a test frequency of 6.28 rad/sec and expressed as dynes/cm². More specifically, dynamic mechanical testing of the polymer samples for measuring tensile storage modulus was accomplished using the following procedure. ASTM-D-4065-94 and ASTM-D-5026-94 were used as guidelines for this procedure. Each polymer emulsion was cast as a film and allowed to dry a minimum of several days at ambient conditions. The dry film thickness was typically in the range of 0.3 to 0.5 mm. For samples that did not film form adequately at room temperature, the polymers were compression molded at 100 to 150° C. The specimens used for testing were die cut from the film and were about 6.3 mm wide and 30 mm long. The specimens were tested on a Rheometrics Solid Analyzer (RSA II), from Rheometric Scientific, Inc., to obtain the tensile dynamic mechanical properties. Data were obtained every 6° C. over the −100 to 200° C. range using a fiber/film fixture and a deformation frequency of 6.28 rad/sec. To help ensure linear viscoelastic conditions, the applied strains were typically 0.05% in the glassy region and up to 1% in the rubbery region. A soak time of one minute was used at each temperature to ensure isothermal conditions. For each temperature, the RSA II calculated the tensile storage modulus (E'), tensile loss modulus (E"), and tangent delta (tan δ) based on the width, thickness and length of the sample.

Measurement of $T_g$, $T_m$, and $H_f$ $T_g$, $T_m$, and $\Delta H_f$ were determined via differential scanning calorimetry (DSC) using a TA Instruments Thermal Analyst 3100 with DSC 2010 module. Polymer samples were thoroughly dried prior to testing. Samples were held at 100° C. in the calorimeter for 5 minutes, cooled to −75° C., and then the scan acquired at a heating rate of 20° C. per minute up to a final temperature of 200° C. The $T_g$ corresponds to the extrapolated onset values obtained from the baseline shift at the glass transition during the heating scan. The melting point temperature corresponds to the peak in the heat flow curve. The heat of fusion was calculated by integrating the area under the melting endotherm; the baseline for this integration was constructed by extrapolating the linear region of the heat flow curve after the melt, back to the point of intersection with the heat flow curve before the melt.

EXAMPLE 1

A polymer emulsion containing crystalline ethylene segments was prepared by first charging a one-gallon stainless steel pressure reactor with the following mixture:

| Material | Mass charged, g |
| --- | --- |
| DI Water | 900 |
| Aerosol MA80I anionic surfactant; supplied by Cytec | 14 |
| Rhodacal DS10 anionic surfactant; supplied by Rhodia | 5 |
| Natrosol 250GR (2%) hydroxyethyl cellulose (HEC); supplied by Rhodia | 200 |
| Lubrizol 2403 monomer (2-acrylamido-2-methylpropane sulfonate salt) | 3 |
| Sodium citrate | 1 |
| Ferrous ammonium sulfate (2% aqueous solution) | 3 |
| Vinyl Acetate | 200 |

Prior to the addition of ferrous ammonium sulfate and vinyl acetate, the pH of the mixture was adjusted to 4.0 with citric acid. The following delay mixtures were utilized:

| Material | Mass charged, g |
| --- | --- |
| Aqueous 4.0% t-BHP | 114 |
| Aqueous 8% sodium formaldehyde sulfoxylates | 126 |
| Aqueous solution containing 55 g Rhodacal DS-10, 15 g Lubrizol 2403, 10 g Tergitol 15S20, and 320 g water | 360 |
| Monomer Solution comprising 97.54 wt % vinyl acetate, 2.29 wt % acrylic acid, and 0.16 wt % dodecylmercaptan | 504 |
| Ethylene | 1300–1500 psig for 6 hours |

Tergitol 15S20 - nonionic surfactant supplied by Union Carbide

The reactor was charged with the contents of the initial mixture and agitation at 100 rpm was begun with a nitrogen purge. Agitation was then increased to 900 rpm and the reactor heated to 60° C. After pressurizing the reactor with ethylene to 1300 psig, 10 g of 8% aqueous sodium formaldehyde sulfoxylate was added to the reactor. Delay feeds of tert-butylhydrogen peroxide (t-BHP)(4%) at 0.20 g/min. and 8% sodium formaldehyde sulfoxylates (SFS) at 0.20 g/min were begun. At initiation, the surfactant delay was begun at 1.00 g/min and the monomer solution delay was begun at 2.0 g/min. At the 30 minute mark, the ethylene pressure was ramped to 1500 psig at a rate of 20 psig/minute. Ethylene pressure of 1500 psig was maintained for the remainder of the reaction. At the 3 hour mark, the monomer solution delay rate was reduced to 0.80 g/min and the redox rates were increased 0.30 g/min. At the 6 hour mark, the monomer delay, surfactant delay, and ethylene delay were stopped. The redox delays were stopped at the 6 hour and 40 minute mark. The reaction was then cooled to 40° C., transferred to a degasser to remove unreacted ethylene, and 2 g of Rhodaline 675 defoamer was added during and after this transfer. The product was then post-treated with additional t-BHP and SFS to reduce residual unreacted vinyl acetate. The following properties of the resulting emulsion polymer were measured:

| | |
| --- | --- |
| Polymer Composition (By solids calculation) | 48% Ethylene 51.1% Vinyl acetate 0.9% Acrylic Acid |
| $T_g$ Onset (° C.) | −30.2 |
| Viscosity (60/12 rpm) (cps) | 210/302 |
| % solids | 47.4 |
| pH | 5.09 |
| $T_m$ (° C.)/Heat of Fusion (J/g) | 76.0/21.5 |

EXAMPLE 2

A polymer emulsion containing crystalline ethylene segments was prepared by the following procedure: A one-gallon stainless steel pressure reactor was charged with the following mixture:

| Material | Mass charged, g |
| --- | --- |
| DI Water | 900 |
| Tergitol 15-S-40 nonionic surfactant | 4 |
| Tergitol 15-S-20 (80%) nonionic surfactant | 5 |
| Natrosol 250GR (2%) HEC | 300 |
| 98.57:1.43 Vinyl Acetate/Acrylic acid mixture | 120 |

The following delay mixtures were utilized:

| Material | Mass charged, g |
| --- | --- |
| Aqueous 10.0% VAZO 56 azonitrile initiator; supplied by DuPont | 125 |
| Surfactant solution composed of 26.2 g of Tergitol 15-S-40, 32.8 g of Tergitol 15-S-20 (80%), 10 g Lubrizol 2403, and 281 g DI water | 300 |
| 98.57:1.43 Vinyl Acetate/Acrylic acid mixture | 540 |
| 5% sodium bicarbonate | 34 g |
| Ethylene | 1400 psig for 5.5 hours |

Agitation at 100 rpm was begun with a nitrogen purge after charging the reactor with the initial mixture. Agitation was then increased to 1000 rpm and the reactor heated to 80° C. After pressurizing the reactor with ethylene to 1400 psig, 15 g of VAZO 56 solution was added at a rate of 1.0 grams/minute. When the 15 grams of initiator had been added, the initiator delay rate was reduced to 0.30 grams/ minute, the monomer delay was begun at 3.0 g/minute and the surfactant delay was begun at 0.83 g/minute. Ethylene pressure of 1400 psig was maintained for 5.5 hours. The vinyl acetate delay was stopped at the 3 hour mark. The surfactant delay and VAZO 56 delay were stopped at the 6 hour mark, followed by holding the reaction mixture at temperature for another 30 minutes. The reaction was then cooled to 40° C., transferred to a degasser, and 2 g of Rhodaline 675 defoamer was added during and after this transfer. The product was then post-treated with iron, t-BHP and SFS to reduce residual unreacted vinyl acetate. The following properties of the resulting emulsion copolymer were measured:

| Copolymer Composition (by solids calculation) | 43% Ethylene |
| | 56.2% Vinyl acetate |
| | 0.8% Acrylic acid |
| $T_g$ Onset (° C.) | −32.8 |
| Viscosity (60/12 rpm) (cps) | 30/35 |
| % solids | 43.7 |
| pH | 4.13 |
| $T_m$ (° C.)/Heat of Fusion (J/g) | 82.8/12.8 |

EXAMPLE 3

An EVA emulsion containing crystalline ethylene segments was prepared by the following procedure: A one-gallon stainless steel pressure reactor was charged with the following mixture:

| Material | Mass charged, g |
| --- | --- |
| DI Water | 1000 |
| Rodapon UB sodium lauryl sulfate | 60 |
| Natrosol 250GR (2%) HEC | 500 |
| Sodium Citrate | 1 |
| Monomer solution containing 96.75 wt % vinyl acetate, 1.25 wt % acrylic acid, and 2.0 wt % dodecylmercaptan | 100 |

Rhodapon UB sodium lauryl sulfate (30% aqueous solution); supplied by Rhodia The following delay mixtures were utilized:

| Material | Mass charged, g |
| --- | --- |
| Aqueous 10.0% ammonium persulfate containing 3.0% sodium bicarbonate | 123 |
| Aqueous 10.0% sodium lauryl sulfate | 330 |
| Monomer solution containing 96.75 wt % vinyl acetate, 1.25 wt % Acrylic acid, and 2.0 wt % dodecylmercaptan | 250 |
| Ethylene | 1400 psi for 5 hours |

Agitation at 100 rpm was begun with a nitrogen purge. Agitation was then increased to 900 rpm and the reactor heated to 80° C. After pressurizing the reactor with ethylene to 1400 psi, 15 g of initiator solution was added at a rate of 1.0 grams/minute. The initiator rate was then reduced to 0.30 grams/minute. After the 15 grams of initiator solution was in the reactor, the monomer delay was begun at 2.78 g/minute and the surfactant delay was begun at 1.10 g/minute. Ethylene pressure of 1400 psi was maintained for 5 hours. The monomer delay was stopped at the 1.5 hour mark. At the 2 hour mark the initiator rate was increased to 0.40 grams/minute. The surfactant delay, initiator delay, and ethylene supply were stopped at the 5 hour mark, followed by holding the reaction mixture at temperature for another 30 minutes. The reaction was then cooled to 40° C., transferred to a degasser, and 2 g of Rhodaline 675 defoamer was added. The following properties of the resulting emulsion copolymer were measured:

| Copolymer Composition (by solids calculation) | 73% Ethylene |
| | 26.6% Vinyl acetate |
| | 0.4% Acrylic acid |
| $T_g$ Onset (° C.) | −37.6 |
| Viscosity (60/12 rpm) (cps) | 560/1050 |
| % solids | 41.0 |
| pH | 6.0 |
| $T_m$ (° C.)/Heat of Fusion (J/g) | 91.1/58.6 |

EXAMPLE 4

A polymer emulsion containing crystalline ethylene segments was prepared by the following procedure: A one-gallon stainless steel pressure reactor was charged with the following mixture:

| Material | Mass charged, g |
| --- | --- |
| DI Water | 1100 |
| Aerosol MA80I | 7.5 |
| Sodium Citrate | 1 |
| Vinyl Acetate | 75 |

Prior to the addition of vinyl acetate, the mixture pH was adjusted to 4.5 with citric acid. The following delay mixtures were utilized:

| Material | Mass charged, g |
| --- | --- |
| Aqueous 10.0% ammonium persulfate containing 4.0% sodium bicarbonate | 93 |
| Rhodacal DS-10, diluted to 15% active | 260 |
| 95:5 Vinyl Acetate/Acrylic acid mixture | 586 |
| Ethylene | 1400 psig for 5.5 hours |

Agitation at 100 rpm was begun with a nitrogen purge after charging the initial mixture to the reactor. Agitation was then increased to 1000 rpm and the reactor heated to 80° C. After pressurizing the reactor with ethylene to 1400 psig, 15 g of initiator solution was added at a rate of 1.0 grams/ minute. When the 15 grams of initiator had been added, the initiator delay rate was reduced to 0.22 grams/minute, the monomer delay was begun at 3.25 g/minute and the surfactant delay was begun at 0.72 g/minute. Ethylene pressure of 1400 psig was maintained for 5.5 hours. The vinyl acetate delay was stopped at the 3 hour mark. The surfactant delay and initiator delay were stopped at the 6 hour mark, followed by holding the reaction mixture at temperature for another 30 minutes. The reaction was then cooled to 40° C., transferred to a degasser, and 2 g of Rhodaline 675 defoamer was added during and after this transfer. The product was then post-treated with iron, t-BHP and SFS to reduce residual unreacted vinyl acetate. The following properties of the resulting emulsion copolymer were measured:

| Copolymer Composition (by solids calculation) | 48% Ethylene |
| --- | --- |
| | 49.7% Vinyl acetate |
| | 2.3% Acrylic acid |
| $T_g$ Onset (° C.) | −28.1 |
| Viscosity (60/12 rpm) (cps) | 109/140 |
| % solids | 48.3 |
| pH | 4.71 |
| $T_m$ (° C.)/Heat of Fusion (J/g) | 83.9/22.9 |

EXAMPLE 5

A three-gallon stainless steel pressure reactor was charged with the following mixture:

| Material | Mass charged, g |
| --- | --- |
| DI Water | 3300 |
| Aerosol MA-801 | 30 |
| Vinyl Acetate | 360 |

The following delay mixtures were utilized:

| Material | Mass charged, g |
| --- | --- |
| Aqueous 10.0% ammonium persulfate containing 4.0% sodium bicarbonate | 345 |
| Aqueous 15.0% diluted solution of Rhodacal DS-10 | 795 |
| Vinyl Acetate | 1655 |
| N-methylolacrylamide (48%) (NMA) | 419 |
| Ethylene | 1400 psig for 5.5 hours |

Agitation at 100 rpm was begun with a nitrogen purge. Agitation was then increased to 600 rpm and the reactor heated to 80° C. After pressurizing the reactor with ethylene to 1400 psig, 15 g of initiator solution was added at a rate of 5.0 g/min. After the 15 grams of initiator were in the reactor, the initiator delay rate was reduced to 0.90 g/min. At initiation, the vinyl acetate delay was begun at 9.0 g/min, the surfactant delay was begun at 2.16 g/min, and the NMA delay was begun at 1.17 g/min. Ethylene pressure of 1400 psig was maintained for 5.5 hours. The vinyl acetate delay was stopped at the 3 hour mark. The ethylene supply was stopped at the 5.5 hour mark. The surfactant delay, NMA delay, and initiator delay were stopped at the 6 hour mark, followed by holding the reaction mixture at temperature for another 30 minutes. The reaction was then cooled, transferred to a degasser, and 2 g of Rhodaline 675 defoamer was added. The following properties of the resulting emulsion polymer were measured:

| Polymer Composition (by solids calculation) | 43% Ethylene |
| --- | --- |
| | 52% Vinyl acetate |
| | 5% NMA |
| $T_g$ Onset (° C.) | −29.6 |
| Viscosity (60/12 rpm) (cps) | 53/55 |
| % solids | 47.2 |
| pH | 5.2 |
| $T_m$ (° C.)/Heat of Fusion (J/g) | 79.0/12.2 |

EXAMPLE 6

A polymer emulsion containing crystalline ethylene segments was prepared by the following procedure: A one-gallon stainless steel pressure reactor was charged with the following mixture:

| Material | Mass charged, g |
| --- | --- |
| DI Water | 840 |
| Aerosol MA80I | 7.25 |
| Natrosol 250GR (2%) | 420 |
| Sodium Citrate | 1 |
| Vinyl Acetate | 72 |

The following delay mixtures were utilized:

| Material | Mass charged, g |
| --- | --- |
| Aqueous 8.24% ammonium persulfate containing 3.35% sodium bicarbonate | 93 |
| Rhodacal DS-10, diluted to 15% active | 260 |
| 94.5:5.5 Vinyl Acetate/Acrylic acid mixture | 586 |
| Ethylene | 1250–1400 psig for 5.5 hours |

Agitation at 100 rpm was begun with a nitrogen purge after charging the initial mixture to the reactor. Agitation was then increased to 1000 rpm and the reactor heated to 80° C. After pressurizing the reactor with ethylene to 1250 psig, 18 g of initiator solution was added at a rate of 1.0 grams/minute. When the 18 grams of initiator had been added, the initiator delay rate was reduced to 0.29 grams/minute, the monomer delay was begun at 2.86 g/minute and the surfactant delay was begun at 0.62 g/minute. One hour after starting all delay feeds, the ethylene pressure was ramped to 1400 psig over the next 40 minutes at a linear rate increase. At the 4 hour mark, the vinyl acetate delay was stopped. At the 7.5 hour mark, the ethylene valve was closed. At the 8 hour mark, the surfactant delay and initiator delay were stopped, followed by holding the reaction mixture at temperature for another 30 minutes. The reaction was then cooled to 40° C., transferred to a degasser, and 2 g of Rhodaline 675 defoamer was added during and after this transfer. The product was then post-treated with iron, t-BHP and SFS to reduce residual unreacted vinyl acetate. The following properties of the resulting emulsion copolymer were measured:

| Polymer Composition (by solids calculation) | 53% Ethylene |
| --- | --- |
| | 44.6% Vinyl acetate |
| | 2.4% acrylic acid |
| $T_g$ Onset (° C.) | −29.6 |
| Viscosity (60/12 rpm) (cps) | 828/1430 |
| % solids | 50.4 |
| PH | 4.73 |
| $T_m$ (° C.)/Heat of Fusion (J/g) | 88.5/25.5 |

EXAMPLE 7

The procedure of Example 6 was followed, except the amount of acrylic acid in the monomer delay was reduced by half, the monomer delay contained 0.30 wt % of dodecylmercaptan, and the pressure was ramped to 1450 psig. The following properties of the resulting emulsion copolymer were measured:

| | |
|---|---|
| Polymer Composition (by solids calculation) | 52.5% Ethylene |
| | 46.4% Vinyl acetate |
| | 1.1% acrylic acid |
| $T_g$ Onset (° C.) | −29.8 |
| Viscosity (60/12 rpm) (cps) | 954/2590 |
| % solids | 50.7 |
| PH | 5.36 |
| $T_m$ (° C.)/Heat of Fusion (J/g) | 87.4/19.2 |

EXAMPLE 8

The procedure of Example 4 was followed, except the initial reactor charge consisted of 30 g of Celvol 205 (20%), 10 g of Aerosol MA80I, 1070 g of water, and 120 g of the monomer solution.

| | |
|---|---|
| Polymer Composition (by solids calculation) | 49% Ethylene |
| | 48.5% Vinyl acetate |
| | 2.5% acrylic acid |
| $T_g$ Onset (° C.) | −30.0 |
| Viscosity (60/12 rpm) (cps) | 5260/15950 |
| % solids | 48.6 |
| pH | 4.61 |
| $T_m$ (° C.)/Heat of Fusion (J/g) | 87.0/28.1 |

EXAMPLE 9

A polymer emulsion containing crystalline ethylene segments was prepared by first charging a 35-gallon stainless steel pressure reactor with the following mixture:

| Material | Mass charged, g |
|---|---|
| DI Water | 26,819 |
| Rhodacal DS-10 | 319 |
| Natrosol 250GR (2% aqueous solution) | 20,114 |
| Sodium citrate | 34 |
| Ferrous ammonium sulfate (2% aqueous solution) | 201 |
| Monomer Solution comprising 94.8 wt % vinyl acetate, 4.65 wt % acrylic acid, and 0.53 wt % dodecylmercaptan | 4859 |

The following delay mixtures were utilized:

| Material | Mass charged, g |
|---|---|
| Aqueous 4.0% t-BHP | 5063 |
| Aqueous 8% sodium formaldehyde sulfoxylate | 5079 |
| Aqueous solution containing 1413 g Rhodacal DS-10 and 8007 g water | 8868 |
| Monomer Solution comprising 94.8 wt % vinyl acetate, 4.65 wt % acrylic acid, and 0.53 wt % dodecylmercaptan | 21711 |

| Material | Mass charged, g |
|---|---|
| Ethylene | 700–1400 psig for 5.5 hours |

Agitation was begun with a nitrogen purge. Agitation was then increased to 375 rpm and the reactor heated to 60° C. After pressurizing the reactor with ethylene to 700 psig, 331 g of 8% aqueous sodium formaldehyde sulfoxylate was added to the reactor. Delay feeds of tert-butylhydrogen peroxide (4%) at 16.1 g/min. and 8% sodium formaldehyde sulfoxylate at 16.1 g/min were begun. After a 10 minute period, the surfactant delay was begun at 26.1 g/min and the monomer solution delay was begun at 122.6 g/min. Redox rates were adjusted during the reaction period to maintain reasonable reaction rates. Ethylene pressure of 700 psig was maintained for 3 hours, after which the pressure was ramped to 1400 psig over a 2 hour period. The monomer solution delay was turned off at the 3 hour mark. The ethylene valve was closed at the 5.5 hour mark. The surfactant delay and initiator delay were stopped at the 6 hour mark. The reaction was then cooled to 35° C., transferred to a degasser to remove unreacted ethylene, and 2 g of Rhodaline 675 defoamer was added. The material was further treated with t-BHP and SFS to reduce unreacted vinyl acetate levels. The following properties of the resulting emulsion polymer were measured:

| | |
|---|---|
| Polymer Composition (By solids calculation) | 43% Ethylene |
| | 54.3% Vinyl acetate |
| | 2.7% Acrylic Acid |
| $T_g$ Onset (° C.) | −12.2 |
| Viscosity (60/12 rpm) (cps) | 1040/2850 |
| % solids | 40.0 |
| pH | 4.69 |
| $T_m$ (° C.)/Heat of Fusion (J/g) | 102.2/8.2 |

EXAMPLE 10

A polymer emulsion containing crystalline ethylene segments was prepared by the following procedure: A one-gallon stainless steel pressure reactor was charged with the following mixture:

| Material | Mass charged, g |
|---|---|
| DI Water | 900 |
| Rhodapon UB | 20 |
| Natrosol 250GR (2%) | 500 |
| Sodium Citrate | 1 |
| Vinyl Acetate | 75 |

Prior to the addition of vinyl acetate, the pH of the mixture was adjusted to 4.5 with citric acid. The following delay mixtures were utilized:

| Material | Mass charged, g |
|---|---|
| Aqueous 10.0% ammonium persulfate containing 3.0% sodium bicarbonate | 99.6 |
| Rhodapon UB, diluted to 10% active | 360 |
| Vinyl Acetate containing 2.19 wt % dodecylmercaptan | 150 |

| Material | Mass charged, g |
|---|---|
| Ethylene | 1400 psig for 5.5 hours |

Agitation at 100 rpm was begun with a nitrogen purge after charging the initial mixture to the reactor. Agitation was then increased to 1000 rpm and the reactor heated to 80° C. After pressurizing the reactor with ethylene to 1400 psig, 10 g of initiator solution was added at a rate of 1.0 grams/minute. When the 10 grams of initiator had been added, the initiator delay rate was reduced to 0.30 grams/minute. At initiation, the monomer delay was begun at 0.5 g/minute and the surfactant delay was begun at 1.20 g/minute. Ethylene pressure of 1400 psig was maintained for 5 hours. All delays were stopped at the 5 hour mark, followed by holding the reaction mixture at temperature for another 30 minutes. The reaction was then cooled to 40° C., transferred to a degasser, and 2 g of Rhodaline 675 defoamer was added during and after this transfer. The product was then post-treated with iron, t-BHP and SFS to reduce residual unreacted vinyl acetate. The following properties of the resulting emulsion copolymer were measured:

| | |
|---|---|
| Copolymer Composition (by solids calculation) | 73% Ethylene |
| | 27% Vinyl acetate |
| $T_g$ Onset (° C.) | −40.2 |
| Viscosity (60/12 rpm) (cps) | 88/104 |
| % solids | 36.3 |
| pH | 5.38 |
| $T_m$ (° C.)/Heat of Fusion (J/g) | 78.8/64.2 |

EXAMPLE 11

A polymer emulsion containing crystalline ethylene segments was prepared by the following procedure: A one-gallon stainless steel pressure reactor was charged with the following mixture:

| Material | Mass charged, g |
|---|---|
| DI Water | 1000 |
| Aerosol MA80I | 9 |
| Rhodacal DS10 | 2 |
| Sodium Citrate | 1 |
| Vinyl Acetate | 80 |
| Dodecylmercaptan | 0.20 |

Prior to the addition of vinyl acetate, the pH of the mixture was adjusted to 5.0 with citric acid.

The following delay mixtures were utilized:

| Material | Mass charged, g |
|---|---|
| Aqueous 10.0% ammonium persulfate containing 4.0% sodium bicarbonate | 132 |
| Rhodacal DS10, diluted to 15% active | 251 |
| Vinyl Acetate containing 3.33 wt % acrylic acid and 0.13 wt % dodecylmercaptan | 593 |
| Ethylene | variable |

Agitation at 100 rpm was begun with a nitrogen purge after charging the initial mixture to the reactor. Agitation was then increased to 500 rpm and the reactor heated to 80° C. After pressurizing the reactor with ethylene to 400 psig, 25 g of initiator solution was added at a rate of 1.0 grams/minute. When the 25 grams of initiator had been added, the initiator delay rate was reduced to 0.30 grams/minute. After 18 grams of the initiator were in the reactor, the monomer delay was begun at 9.0 g/minute and the surfactant delay was begun at 1.20 g/minute. Ethylene pressure of 400 psig was maintained for 1.5 hours. At the 1 hour mark, the monomer delay was stopped, the agitation rate was increased to 700 rpm, and the surfactant delay rate was reduced to 0.60 grams/minute. At the 1.5 hour mark, the agitation rate was increased to 900 rpm and ethylene pressure ramp was started. The ethylene pressure was ramped to 1450 psig at a rate of 2.5 psig/minute. Once 1450 psig was reached this pressure was maintained. At the 2 hour mark, the monomer delay was re started at a rate of 0.25 grams/minute. At the 5.5 hour mark, the monomer delay was stopped and the ethylene valve was closed. All other delays were stopped at the 6 hour mark followed by holding the reaction mixture at temperature for another 60 minutes. The reaction was then cooled to 40° C., transferred to a degasser, and 2 g of Rhodaline 675 defoamer was added during and after this transfer. The product was then post-treated with iron, t-BHP and SFS to reduce residual unreacted vinyl acetate. The following properties of the resulting emulsion copolymer were measured:

| | |
|---|---|
| Copolymer Composition (by solids calculation) | 43% Ethylene |
| | 55.3% Vinyl acetate |
| | 1.7% Acrylic acid |
| $T_g$ Onset (° C.) | +9.3 |
| Viscosity (60/12 rpm) (cps) | 117/137 |
| % solids | 47.9 |
| pH | 5.10 |
| $T_m$ (° C.)/Heat of Fusion (J/g) | 81.5/30.1 |

EXAMPLE 12

A polymer emulsion containing crystalline ethylene segments was prepared by the following procedure: A one-gallon stainless steel pressure reactor was charged with the following mixture:

| Material | Mass charged, g |
|---|---|
| DI Water | 1200 |
| Aerosol MA80I | 12 |
| Natrosol 250GR (2%) | 300 |
| Sodium Citrate | 1 |
| Monomer solution consisting of 96.73 wt % vinyl acetate, 1.45 wt % acrylic acid, and 1.82 wt % dodecylmercaptan | 150 |

The following delay mixtures were utilized:

| Material | Mass charged, g |
|---|---|
| Aqueous 10 wt % ammonium persulfate containing 3.0 wt % sodium bicarbonate | 183 |

-continued

| Material | Mass charged, g |
|---|---|
| Rhodacal DS-10, diluted to 10% active | 480 |
| Monomer solution consisting of 96.73 wt % vinyl acetate, 1.45 wt % acrylic acid, and 1.82 wt % dodecylmercaptan | 375 |
| Ethylene | 1400 psig for 5 hours |

Agitation at 100 rpm was begun with a nitrogen purge after charging the initial mixture to the reactor. Agitation was then increased to 1000 rpm and the reactor heated to 80° C. After pressurizing the reactor with ethylene to 1400 psig, 20 g of initiator solution was added at a rate of 1.0 grams/minute. When the 20 grams of initiator had been added, the initiator delay rate was reduced to 0.45 grams/minute. At initiation, the monomer solution delay was begun at 4.17 g/minute and the surfactant delay was begun at 1.60 g/minute. Ethylene pressure of 1400 psig was maintained throughout the reaction period. At the 1.5 hour mark, the monomer solution delay was stopped. At the 2 hour mark, the initiator delay rate was increased to 0.60 g/min. At the 5 hour mark, the surfactant and initiator delays were stopped, and the ethylene valve was closed, followed by holding the reaction mixture at temperature for another 30 minutes. The reaction was then cooled to 40° C., transferred to a degasser, and 2 g of Rhodaline 675 defoamer was added during and after this transfer. The product was then post-treated with iron, t-BHP and SFS to reduce residual unreacted vinyl acetate. The following properties of the resulting emulsion copolymer were measured:

| Polymer Composition (by solids calculation) | 56% Ethylene |
| | 43.3% Vinyl acetate |
| | 0.7% acrylic acid |
| $T_g$ Onset (° C.) | −32.2 |
| Viscosity (60/12 rpm) (cps) | 34/38 |
| % solids | 40.6 |
| pH | 5.41 |
| $T_m$ (° C.)/Heat of Fusion (J/g) | 87.7/41.5 |

EXAMPLE 13

An ethylene/vinyl acetate emulsion containing crystalline ethylene segments was prepared by the following procedure: A one-gallon stainless steel pressure reactor was charged with the following mixture:

| Material | Mass charged, g |
|---|---|
| DI Water | 1100 |
| Aerosol MA80I | 11 |
| Sodium Citrate | 1 |
| Vinyl acetate | 100 |

The premix pH was adjusted to 4.5 with citric acid, prior to the addition of the vinyl acetate. The following delay mixtures were utilized:

| Material | Mass charged, g |
|---|---|
| Aqueous 10.0% ammonium persulfate containing 4.0% sodium bicarbonate | 172 |
| Aqueous solution composed of 47.5 g Rhodacal DS10, 10 g Lubrizol 2403, and 292.5 g DI water | 305 |
| Monomer solution containing 96.44 wt % vinyl acetate, 2.0 wt % Acrylic acid, and 1.56 wt % dodecylmercaptan | 416 |
| Ethylene | 1400 psi for 6 hours |

Agitation at 100 rpm was begun with a nitrogen purge. Agitation was then increased to 1000 rpm and the reactor heated to 80° C. After pressurizing the reactor with ethylene to 1400 psi, 15 g of initiator solution was added at a rate of 1.0 grams/minute. The initiator rate was then reduced to 0.37 grams/minute. After the 15 grams of initiator solution was in the reactor, the monomer delay was begun at 4.62 g/minute and the surfactant delay was begun at 0.85 g/minute. Ethylene pressure of 1400 psi was maintained for 6 hours. The monomer delay was stopped at the 1.5 hour mark. At the 2 hour mark the initiator rate was increased to 0.50 grams/minute. The surfactant delay, initiator delay, and ethylene supply were stopped at the 6 hour mark, followed by holding the reaction mixture at temperature for another 30 minutes. The reaction was then cooled to 40° C., transferred to a degasser, and 2 g of Rhodaline 675 defoamer was added. The following properties of the resulting emulsion copolymer were measured:

| Copolymer Composition (by solids calculation) | 62% Ethylene |
| | 37.4% Vinyl acetate |
| | 0.6% Acrylic acid |
| $T_g$ Onset (° C.) | −29.7 |
| Viscosity (60 rpm) (cps) | 269 |
| % solids | 48.2 |
| pH | 6.4 |
| $T_m$ (° C.)/Heat of Fusion (J/g) | 90.6/40.6 |

EXAMPLE 14

Heat seal evaluation tests were performed on corrugated cardboard having differing adhesive formulations applied thereto using the manual heat seal method where the coated and uncoated corrugated cardboard was held in a V-formation and forced hot air applied over both surfaces followed by touching the two heated surfaces with light hand pressure to form the bond. The substrates were rated for non-block, hot green strength and final bond strength. The results are set forth in Table A. AIRFLEX® EF940 vinyl acetate/ethylene polymer emulsion is an entirely amorphous vinyl acetate/ethylene polymer containing approximately 50 wt % ethylene and an approximate $T_g$=−35° C.

TABLE A

| Sample | Non-block Rating | Hot Green Strength | Final Bond |
|---|---|---|---|
| Example 1 | 4 | 3 | 6 |
| Example 6 | 3 | 3 | 4 |
| Example 12 | 3 | 2 | 6 |
| AIRFLEX EF940 VAE polymer emulsion | 8 | ND | 6 |

ND = no data

The data in Table A show that the examples of this invention unexpectedly showed a good balance of non-blocking property, hot green strength and final bonding, compared to AIRFLEX EF940 VAE which has a similar ethylene level in the polymer, but had a poor rating for non-block.

EXAMPLE 15

Heat seal evaluation tests were performed on SBS folding carton stock (0.024 Masterprint, 83 pounds/thousand square feet) having differing adhesive formulations applied thereto where the coated and uncoated boards were placed on top of each other and then placed in the jaws of the Sentinel Laboratory Heat Sealer for 1 second at 5 psig with the platens heated in such a manner to obtain an adhesive bond temperature of 220° F. The substrates were rated for non-block, hot green strength and final bond strength. The results are set forth in Table B. AIRFLEX 300 is an entirely amorphous VAE containing approximately 10 wt % ethylene and having an approximate $T_g$ of +15° C. AIRFLEX 920 vinyl acetate/ethylene polymer emulsion is an entirely amorphous vinyl acetate/ethylene polymer containing approximately 35 wt % ethylene and having an approximate $T_g$ of −20° C.

TABLE B

| Sample | Non-block Rating | Hot Green Strength | Final Bond |
| --- | --- | --- | --- |
| Example 3 | 1 | 3.5 | 6 |
| Example 5 | 1 | 2 | 6 |
| Example 13 | 2 | 3.5 | 6 |
| Example 10 | 3 | 3 | 6 |
| Example 8 | 2 | 3 | 6 |
| Example 12 | 3 | 4 | 6 |
| Example 6 | 3 | 4 | 6 |
| AIRFLEX 300 VAE | 1 | 2 | 0 |
| AIRFLEX EF940 VAE | 8 | ND | 6 |
| AIRFLEX 920 VAE | 8 | ND | 6 |

The data in Table B show that the adhesives of the invention examples unexpectedly showed superior balance of properties for non-blocking, green strength, and final bond, compared to the AIRFLEX VAE polymers which have comparable amounts of ethylene in the polymers. AIRFLEX 300 VAE showed good non-blocking property, but green strength was poor and it did not bond. AIRFLEX EF940 VAE and AIRFLEX EF940 VAE showed poor non-blocking property but good bonding.

Without intending to be bound by theory, it is believed that the difference in performance between the invention examples and the AIRFLEX VAE polymers is due to the ethylene distribution (all amorphous for the AIRFLEX VAE polymers versus the presence of crystallinity for the invention examples.)

What is claimed is:

1. A process for forming a carton from paperboard stock comprising the steps:

applying an aqueous based adhesive to select parts of a paperboard carton blank obtained from a paperboard feedstock;

drying the aqueous based adhesive;

folding the select parts of the adhesive coated carton blank onto cooperating parts of the paperboard blank; and, heat sealing the select and cooperating parts thereby forming the carton;

wherein the aqueous based adhesive is comprised of a semi-crystalline vinyl acetate/ethylene polymer emulsion formed by emulsion polymerization and having (a) a crystalline melting point ($T_m$) ranging from 35 to 110° C., measured at a heat rate of 20° C./minute and, (b) a tensile storage modulus of at least $1 \times 10^4$ dynes/cm$^2$ at 115° C. measured at 6.28 rad/sec.

2. The process of claim 1 wherein the polymer emulsion is comprised of a polymer comprised of from 15 to 90% by weight of polymerized units of vinyl acetate and from 10 to 85% by weight of polymerized units of ethylene based upon the total weight of the polymer.

3. The process of claim 1 wherein the polymer is comprised of from 25 to 80% by weight of polymerized units of vinyl acetate and from 20 to 75% by weight of polymerized units of ethylene based upon the total weight of the polymer.

4. The process of claim 1 wherein heat sealing is effected by contact with hot air.

5. The process of claim 1 wherein the polymer is comprised of 15 to 80% by weight of polymerized units of vinyl acetate, 20 to 85% by weight of polymerized units of ethylene, and 0 to 10% by weight of polymerized units of another monomer, based on the total weight of the polymer.

6. The process of claim 5 wherein polymerized carboxylic acid units are present in the polymer in an amount from 0.2 to 10% by weight of the polymer.

7. The process of claim 6 wherein the polymer consists essentially of polymerized units of vinyl acetate, ethylene, and acrylic acid.

8. The process of claim 1 wherein the crystalline heat of fusion of the polymer is from 5 to 100 joules per gram as measured at a heat rate of 20° C. per minute.

9. The process of claim 8 wherein the glass transition temperature of the polymer is from +25° C. to −40° C. as measured at a heat rate of 20° C. per minute.

10. The process of claim 9 wherein the crystalline thermal melting point ranges from 50 to 90° C. as measured at a heat rate of 20° C. per minute.

11. The process of claim 1 wherein the polymer is comprised of from 35 to 75% by weight of polymerized units of vinyl acetate and from 25 to 65% by weight of polymerized units of ethylene, based upon the total weight of the polymer.

12. The process of claim 1 wherein the polymer is comprised of from 30 to 50% by weight of polymerized units of vinyl acetate and from 50 to 70% by weight of polymerized units of ethylene, based upon the total weight of the polymer.

13. The process of claim 1 wherein the polymer is non-blocking at temperatures of 75° C. or less.

14. The process of claim 1 wherein the polymer is non-blocking at temperatures of 50° C. or less.

15. A process for forming a carton from paperboard stock comprising the steps:

applying an aqueous based adhesive to said paperboard feedstock;

drying the aqueous based adhesive;

forming a paperboard carton blank from the adhesive coated paperboard feedstock;

folding select parts of said paperboard carton blank onto cooperating parts of the paperboard blank; and, heat sealing the select and cooperating parts thereby forming the carton;

wherein the aqueous based adhesive is comprised of a semi-crystalline vinyl acetate/ethylene polymer formed by emulsion polymerization and having (a) a crystalline melting point ($T_m$) ranging from 35 to 110° C., measured at a heat rate of 20° C./minute and, (b) a tensile storage modulus of at least $1\times10^4$ dynes/cm$^2$ at 115° C. measured at 6.28 rad/sec.

16. The process of claim 15 wherein the polymer is comprised of from 15 to 90% by weight of polymerized units of vinyl acetate and from 10 to 85% by weight of polymerized units of ethylene based upon the total weight of the polymer.

17. The process of claim 15 wherein the polymer is comprised of from 25 to 80% by weight of polymerized units of vinyl acetate and from 20 to 75% by weight of polymerized units of ethylene based upon the total weight of the polymer.

18. The process of claim 15 wherein the drying of said adhesive is effected by contact with hot air.

19. The process of claim 15 wherein the polymer is comprised of 15 to 80% by weight of polymerized units of vinyl acetate, 20 to 85% by weight of polymerized units of ethylene, and 0 to 10% by weight of polymerized units of another monomer, based on the total weight of the polymer.

20. The process of claim 19 wherein polymerized carboxylic acid units are present in said polymer in an amount from about 0.2 to 10% by weight of the polymer.

21. The process of claim 15 wherein the crystalline heat of fusion of the polymer is from 5 to 100 joules per gram as measured at a heat rate of 20° C. per minute.

22. The process of claim 15 wherein the crystalline heat of fusion ranges from 15 to 70 joules per gram as measured at a heat rate of 20° C. per minute.

23. The process of claim 15 wherein the polymer is non-blocking at temperatures of 75° C. or less.

24. The process of claim 15 wherein the polymer is non-blocking at temperatures of 50° C. or less.

* * * * *